United States Patent
Yang et al.

(10) Patent No.: US 12,519,587 B2
(45) Date of Patent: Jan. 6, 2026

(54) METHOD FOR MEASURING REFERENCE SIGNAL, TERMINAL, AND NETWORK SIDE DEVICE

(71) Applicant: VIVO MOBILE COMMUNICATION CO., LTD., Dongguan (CN)

(72) Inventors: Ang Yang, Dongguan (CN); Peng Sun, Dongguan (CN); Yu Yang, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 479 days.

(21) Appl. No.: 18/106,450

(22) Filed: Feb. 6, 2023

(65) Prior Publication Data

US 2023/0188281 A1 Jun. 15, 2023

Related U.S. Application Data

(63) Continuation of application No. PCT/CN2021/110533, filed on Aug. 4, 2021.

(30) Foreign Application Priority Data

Aug. 6, 2020 (CN) .......................... 202010785151.8

(51) Int. Cl.
H04L 5/00 (2006.01)
(52) U.S. Cl.
CPC .......... H04L 5/0048 (2013.01); H04L 5/0035 (2013.01); H04L 5/0098 (2013.01)
(58) Field of Classification Search
CPC .... H04L 5/0048; H04L 5/0035; H04L 5/0098
See application file for complete search history.

(56) References Cited

U.S. PATENT DOCUMENTS

| | | | | |
|---|---|---|---|---|
| 11,991,542 | B2* | 5/2024 | Cao | H04W 24/10 |
| 12,342,182 | B2* | 6/2025 | Kaikkonen | H04W 24/10 |
| 2019/0274146 | A1* | 9/2019 | Tang | H04W 24/08 |
| 2019/0306734 | A1* | 10/2019 | Huang | H04W 24/08 |
| 2020/0076568 | A1* | 3/2020 | Nguyen | H04L 7/042 |
| 2020/0252997 | A1* | 8/2020 | Sirotkin | H04W 88/10 |
| 2020/0314675 | A1* | 10/2020 | Lin | H04W 24/10 |
| 2021/0083730 | A1* | 3/2021 | Hwang | H04B 7/0408 |
| 2022/0116809 | A1* | 4/2022 | Cheng | H04W 56/001 |
| 2022/0132527 | A1* | 4/2022 | Cui | H04W 56/001 |
| 2022/0150919 | A1* | 5/2022 | Harada | H04W 72/566 |
| 2023/0188281 | A1* | 6/2023 | Yang | H04L 5/0035 370/329 |

(Continued)

FOREIGN PATENT DOCUMENTS

| | | |
|---|---|---|
| CN | 104247495 A | 12/2014 |
| CN | 110809894 A | 2/2020 |

(Continued)

OTHER PUBLICATIONS

Extended European Search Report issued in related European Application No. 21852560.8, mailed Dec. 14, 2023, 6 pages.

(Continued)

*Primary Examiner* — Fahmida S Chowdhury
(74) *Attorney, Agent, or Firm* — IPX PLLC

(57) ABSTRACT

A method for measuring a reference signal, a terminal, and a network side device are provided. The method includes: performing, by a terminal, L1 measurement on a reference signal of a neighboring cell or a neighboring Transmission and Reception Point (TRP) based on a measurement restriction condition to obtain a measurement result; and sending, by the terminal, the measurement result.

20 Claims, 6 Drawing Sheets

200

The terminal performs L1 measurement on a reference signal of a neighboring cell/neighboring TRP based on a measurement restriction condition to obtain a measurement result — S202

The terminal sends the measurement result — S204

(56) References Cited

FOREIGN PATENT DOCUMENTS

| CN | 110896550 | A | 3/2020 |
| CN | 111095824 | A | 5/2020 |
| CN | 111294825 | A | 6/2020 |
| CN | 111314952 | A | 6/2020 |
| WO | 2019215900 | A1 | 11/2019 |
| WO | 2019223684 | A1 | 11/2019 |
| WO | 2020052491 | A1 | 3/2020 |

OTHER PUBLICATIONS

Notice of Reason of Refusal issued in related Japanese Application No. 2023-507717, mailed May 7, 2024, 6 pages.
Ericsson, "Lower-layer mobility enhancements", 3GPP TSG-RAN WG1 Meeting #99, R1-1912060, Nov. 2019, 9 pages.
Huawei, HiSilicon, "Discussion on RRM impacts of FR2 inter-band CA", 3GPP TSG-RAN WG4 Meeting #94-e, R4-2001582, Feb. 2020, 5 pages.
Notice of Rejection issued in related Japanese Application No. 2023-507717, mailed Dec. 3, 2024, 5 pages.
Ericsson, Introduction of L1-RSRP measurements with CCA, 3GPP TSG RAN WG4 #95_e, R4-2008580, Jun. 2020, 14 pages.
International Search Report issued in corresponding International Application No. PCT/CN2021/110533, mailed Sep. 28, 2021, 4 pages.
China Telecom, 36300CR for introduction of even further mobility enhancement in E-UTRAN, 3GPP TSG-RAN2 Meeting #109bis-e, R2-2003262, Apr. 2020, 35 pages.
First Office Action issued in related Chinese Application No. 202010785151.8, mailed Jun. 10, 2022, 8 pages.

* cited by examiner

300

A network side device receives a measurement result, where the measurement result is obtained by a terminal performing L1 measurement on a reference signal of a neighboring cell/neighboring TRP based on a measurement restriction condition ~ S302

FIG. 3

METHOD FOR MEASURING REFERENCE SIGNAL, TERMINAL, AND NETWORK SIDE DEVICE

CROSS-REFERENCE TO RELATED APPLICATIONS

This application is a continuation of International Application No. PCT/CN2021/110533, filed on Aug. 4, 2021, which claims priority to Chinese Patent Application No. 202010785151.8, filed on Aug. 6, 2020. The entire contents of each of the above-identified applications are expressly incorporated herein by reference.

TECHNICAL FIELD

This application relates to the field of communications technologies, and in particular, to a method for measuring a reference signal, a terminal, and a network side device.

BACKGROUND

The existing Layer 1 (L1) measurement technology mainly focuses on the Reference Signal (RS) of the serving cell, and there are a series of measurement restrictions. However, the measurement on the RS of the neighboring cell can only be performed at Layer 3, and is limited within the measurement time configuration. For example, when the RS of the neighboring cell is a Synchronization Signal (SS) and Physical Broadcast Channel (PBCH) Block (SSB), the measurement on the SSB is limited within the SS/PBCH Block Measurement Time Configuration (SMTC). Therefore, the terminal cannot effectively perform L1 measurement on the RS of the neighboring cell due to the lack of measurement restriction in the related art, which is not conducive to mobility management, such as cell handover, and the like.

SUMMARY

Embodiments of this application provide a method for measuring a reference signal, a terminal, and a network side device.

According to a first aspect, a method for measuring a reference signal is provided. The method includes: performing, by a terminal, L1 measurement on a reference signal of a neighboring cell/neighboring transmission and reception point (TRP) based on a measurement restriction condition to obtain a measurement result; and sending, by the terminal, the measurement result.

According to a second aspect, a method for measuring a reference signal is provided. The method includes: receiving, by a network side device, a measurement result, where the measurement result is obtained by a terminal performing L1 measurement on a reference signal of a neighboring cell/neighboring TRP based on a measurement restriction condition.

According to a third aspect, a terminal is provided. The terminal includes: a measurement module, configured to perform L1 measurement on a reference signal of a neighboring cell/neighboring TRP based on a measurement restriction condition to obtain a measurement result; and a sending module, configured to send the measurement result.

According to a fourth aspect, a network side device is provided. The network side device includes: a receiving module, configured to receive a measurement result, where the measurement result is obtained by a terminal performing L1 measurement on a reference signal of a neighboring cell/neighboring TRP based on a measurement restriction condition.

According to a fifth aspect, a terminal is provided. The terminal includes a processor, a memory, and a program or an instruction stored in the memory and executable on the processor, where when the program or the instruction is executed by the processor, the method according to the first aspect is implemented.

According to a sixth aspect, a network side device is provided. The network side device includes a processor, a memory, and a program or an instruction stored in the memory and executable on the processor, and when the program or the instruction is executed by the processor, the method according to the second aspect is implemented.

According to a seventh aspect, a readable storage medium is provided. The readable storage medium stores a program or an instruction, and when the program or the instruction is executed by a processor, the method according to the first aspect is implemented, or the method according to the second aspect is implemented.

According to an eighth aspect, a chip is provided. The chip includes a processor and a communications interface, the communications interface is coupled to the processor, and the processor is configured to run a program or an instruction, to implement the method according to the first aspect, or the method according to the second aspect.

In the embodiments of this application, the terminal may perform L1 measurement on the reference signal of the neighboring cell/neighboring TRP based on a measurement restriction condition to obtain a measurement result, and send the measurement result to the network side device.

BRIEF DESCRIPTION OF DRAWINGS

FIG. 3 is a schematic flowchart of a method for measuring a reference signal according to another embodiment of this application;

DETAILED DESCRIPTION

The following describes the embodiments of this application with reference to the accompanying drawings in the embodiments of this application. Apparently, the described embodiments are some but not all of the embodiments of this application. All other embodiments obtained by a person of ordinary skill in the art based on the embodiments of this application without creative efforts shall fall within the protection scope of this application.

The terms "first," "second," and the like in the specification and claims of this application are used to distinguish between similar objects instead of describing a specific order or sequence. It should be understood that, the term used in such a way is interchangeable in proper circumstances, so that the embodiments of this application can be implemented in an order other than the order illustrated or described herein. Objects classified by "first" and "second" are usually of a same type, and the number of objects is not limited. For example, there may be one or more first objects. In addition, in the specification and the claims, "and/or" represents at least one of connected objects, and a character "/" generally represents an "or" relationship between associated objects.

It should be noted that the technology described in the embodiments of this application is not limited to a Long Term Evolution (LTE)/LTE-Advanced (LTE-A) system, and may also be used in other wireless communications systems such as Code Division Multiple Access (CDMA), Time Division Multiple Access (TDMA), Frequency Division Multiple Access (FDMA), Orthogonal Frequency Division Multiple Access (OFDMA), Single-carrier Frequency-Division Multiple Access (SC-FDMA), and another system. The terms "system" and "network" in the embodiments of this application may be used interchangeably. The described technologies can be applied to both the systems and the radio technologies mentioned above as well as to other systems and radio technologies. However, a New Radio (NR) system is described in the following description for illustrative purposes, and the NR terminology is used in most of the following description, although these technologies can also be applied to applications other than the NR system application, such as the $6^{th}$ Generation (6G) communications system.

Figures 1, 2:
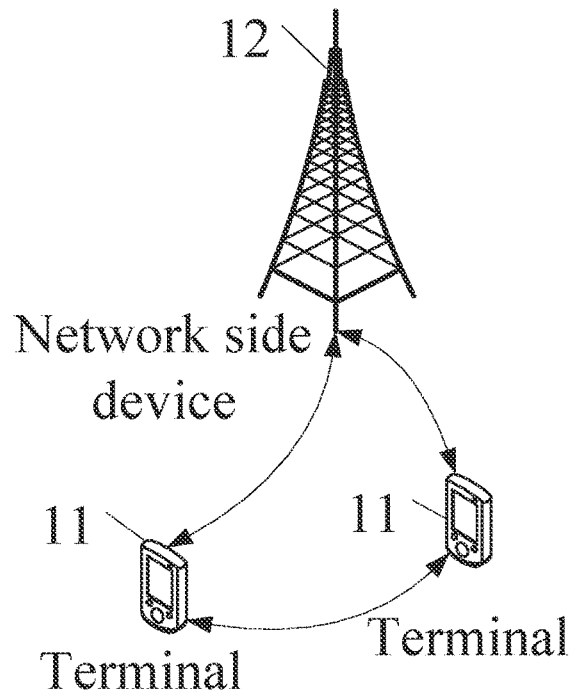
FIG. 1 is a block diagram of a wireless communications system according to an embodiment of this application.
FIG. 2 is a schematic flowchart of a method for measuring a reference signal according to an embodiment of this application.

FIG. 1 is a block diagram of a wireless communications system to which embodiments of this application can be applied. The wireless communications system includes a terminal 11 and a network side device 12. The terminal 11 may also be referred to as a terminal device or User Equipment (UE). The terminal 11 may be a terminal side device such as a mobile phone, a tablet personal computer, a laptop computer or a notebook computer, a Personal Digital Assistant (PDA), a palmtop computer, a netbook, an Ultra-Mobile Personal Computer (UMPC), a Mobile Internet Device (MID), a wearable device, Vehicle User Equipment (VUE), or Pedestrian User Equipment (PUE). The wearable device includes a bracelet, a headset, glasses, and the like. It should be noted that a specific type of the terminal 11 is not limited in the embodiments of this application. The network side device 12 may be a base station or a core network. The base station may be referred to as a NodeB, an evolved NodeB, an access point, a Base Transceiver Station (BTS), a radio base station, a radio transceiver, a Basic Service Set (BSS), an Extended Service Set (ESS), a Node B, an evolved Node B (eNB), a next generation Node B (gNB), a home NodeB, a home evolved NodeB, a WLAN access point, a WiFi node, a Transmitting Receiving Point (TRP), or another appropriate term in the art. As long as the same technical effect is achieved, the base station is not limited to a specific technical term. It should be noted that the base station in the NR system is taken only as an example in the embodiments of this application, but a specific type of the base station is not limited.

A Frequency Range 1 (FR 1) frequency band and a Frequency Range 2 (FR 2) frequency band are mentioned in this application. A frequency range of the FR 1 frequency band is 450 MHz-6 GHz, which is also referred to as the sub 6 GHz frequency band; and a frequency range of the FR 2 frequency band is 24.25 GHz-52.6 GHz, which is usually referred to as a millimeter wave (mmWave). In this application, the FR 2 not only refers to the narrow frequency range of 24.25 GHz-52.6 GHz, but also to other possible higher frequency ranges than that of the FR 1. For example, the FR 2 in this application may also refer to an FR 3, an FR 4, and higher frequency bands.

With reference to the accompanying drawings, the following describes in detail a method for measuring a reference signal, a terminal, and a network side device in the embodiments of this application based on specific embodiments and application scenarios thereof.

As shown in FIG. 2, an embodiment of this application provides a method 200 for measuring a reference signal. The method can be executed by a terminal, that is, the method can be executed by software or hardware installed in the terminal. The method includes the following steps.

S202: The terminal performs L1 measurement on a reference signal of a neighboring cell/neighboring Transmission and Reception Point (TRP) based on a measurement restriction condition to obtain a measurement result.

S204: The terminal sends the measurement result.

In some implementations, the foregoing measurement restriction condition is associated with at least one of the following: whether the reference signal in the serving cell/serving TRP conflicts with the reference signal of the neighboring cell/neighboring TRP; a frequency band position of the reference signal, such as the FR 1 and the FR 2; whether the reference signal in the serving cell/serving TRP and the reference signal of the neighboring cell/neighboring TRP have a same SubCarrier Spacing (SCS) or not; and the purpose of the reference signal.

In this embodiment, the terminal may perform L1 measurement on the reference signal of the neighboring cell based on the measurement restriction condition, and may also perform L1 measurement on the reference signal of the neighboring TRP based on the measurement restriction condition.

The neighboring TRP mentioned in the embodiments of this application may be a TRP in the neighboring cell in an inter-cell Multi-TRP (inter-cell MTRP) scenario; and may also be a neighboring TRP in the serving cell in an intra-cell Multi-TRP (intra-cell MTRP) scenario.

It should be noted that the neighboring cell may also be a neighboring Transmission and Reception Point (TRP), or that the neighboring cell includes the neighboring TRP. A serving cell and a neighboring cell can be distinguished based on identifier information such as a Physical Cell Identifier (PCI), a COntrol REsource SET Pool Index (CORESETPoolIndex), a Transmission and Reception Point IDentifier (TRP ID), and other types of cell identifiers.

The reference signal of the neighboring cell/neighboring TRP includes at least one of the following: a Synchronization Signal (SS) and Physical Broadcast Channel (PBCH) Block (SSB); a Channel State Information-Reference Signal (CSI-RS); a Sounding Reference Signal (SRS); a Phase Tracking Reference Signal (PTRS); and a Tracking Reference Signal (TRS).

In the embodiments of this application, the terminal may perform L1 measurement on the reference signal of the neighboring cell/neighboring TRP based on a measurement restriction condition to obtain a measurement result, and send the measurement result to the network side device, which solves the problem that the terminal cannot effectively perform L1 measurement on the reference signal of the neighboring cell due to the lack of measurement restriction in the related art, which is not conducive to mobility management, so that it is convenient to coordinate inter-cell/TRP interference, improve system capacity, and improve user experience.

In some implementations, when the reference signal is the SSB, the network side device may also configure an SSB periodicity and ssb-PositionsInBurst, so that the terminal may predict all SSB positions and periodicities of the neighboring cell/neighboring TRP. ssb-PositionsInBurst refers to the position of the SSB in a cluster. Generally, a base station may send an SSB cluster regularly. An SSB cluster includes a plurality of SSBs, and the position of the SSB in the cluster refers to the order in which the SSB is located in these SSBs. For example, before S202, the terminal may also receive configuration information from the network side device, and the configuration information indicates the SSB periodicity, ssb-PositionsInBurst, and the like of the neighboring cell/neighboring TRP.

In an example, this embodiment may configure the SSB periodicity and the ssb-PositionsInBurst in the serving cell configuration (ServingCellConfig), the serving cell common configuration (ServingCellConfigCommon), or the serving cell common configuration system information block (ServingCellConfigCommonSIB) of the serving cell or the neighboring cell.

If the serving cell is used to configure the SSB periodicity and the ssb-PositionsInBurst, the network side device may also configure identifier information of the neighboring cell/neighboring TRP, such as a physical cell identifier (Physical Cell Identifier, PCI) and a COntrol REsource SET Pool Index (CORESETPoolIndex), and the CORESETPoolIndex may be used as a TRP identifier; a TRP ID, or other types of cell identifiers.

In an example, the measurement behavior described in S202 is performed within the measurement time configuration, that is, the measurement restriction condition in this example may refer to that the terminal performs L1 measurement on the reference signal of the neighboring cell/neighboring TRP within the measurement time configuration, to obtain a measurement result.

For example, when the reference signal is the SSB of the neighboring cell/neighboring TRP, the terminal performs L1 measurement on the SSB of the neighboring cell/neighboring TRP within the SS/PBCH Block Measurement Time Configuration (SMTC), and obtains a measurement result. For another example, when the reference signal is the CSI-RS of the neighboring cell/neighboring TRP, the terminal performs L1 measurement on the CSI-RS of the neighboring cell/neighboring TRP within the CSI-RS Measurement Time Configuration (CMTC), and obtains a measurement result. In some implementations, the CSI-RS is a CSI-RS for mobility. For still another example, when the reference signal is the SRS of the neighboring cell/neighboring TRP, the terminal performs L1 measurement on the SRS of the neighboring cell/neighboring TRP within the SRS measurement time configuration, and obtains a measurement result. Where the SSB and the measurement time configuration are mentioned later can be extended to the CSI-RS and the CSI-RS measurement time configuration, and the SRS and the SRS measurement time configuration. Details are not described again.

In some implementations, the CSI-RS and the SRS may also determine the measurement time configuration based on the SMTC, or determine the measurement time configuration based on other reference signals. The determining the measurement time configuration based on the SMTC may refer to directly using the SMTC as the measurement time configuration or using a linear processing result of the SMTC as the measurement time configuration, such as a * SMTC+b, where a is a decimal, and b is a decimal or an integer. In some implementations, a=1; and b may be negative or positive.

In an example, the measurement behavior described in S202 may not be limited by the measurement time configuration. For example, when the reference signal is the SSB of the neighboring cell/neighboring TRP, the terminal may perform L1 measurement on the SSB of the neighboring cell/neighboring TRP without being limited by the measurement time configuration. In this example, "without being limited by the measurement time configuration" may also be understood as a special case of the measurement restriction condition. There are similar behaviors for the CSI-RS and the SRS of the neighboring cell/neighboring TRP.

The measurement behavior described in the foregoing two examples may be realized by the configuration of the network side device, and may also be realized by the terminal capability. For example, the network side device configures that the terminal performs L1 measurement on the reference signal of the neighboring cell/neighboring TRP within the measurement time configuration to obtain a measurement result; for another example, the terminal has strong capability, and if a specific capability condition is met, the terminal may perform L1 measurement on the reference signal of the neighboring cell/neighboring TRP to obtain a measurement result without being limited by the measurement time configuration.

The reference signal of the neighboring cell/neighboring TRP mentioned in the embodiments of this specification may meet at least one of the following:

1) Configuration information of a reference signal of the terminal is configured with cell identifier information of the neighboring cell/neighboring TRP. For example, the configuration information of the reference signal of the terminal configures/activates/updates the cell identifier information of the neighboring cell/neighboring TRP.

In this example, when the configuration information of the reference signal is configured with the cell identifier information of the neighboring cell/neighboring TRP, the terminal determines that the reference signal is a cell reference signal of the neighboring cell/neighboring TRP.

2) A Transmission Configuration Indicator (TCI)/spatial relation information/Quasi-Co-Location (QCL) information associated with the reference signal configuration of the terminal is associated with the reference signal of the neighboring cell/neighboring TRP.

In some implementations, that the TCI is associated with the reference signal of the neighboring cell/neighboring TRP mentioned in this example may be that the reference signal in the QCL information included in the TCI belongs to the neighboring cell/neighboring TRP. For example, the configuration information of the reference signal in the QCL information included in the TC includes the identifier information of the neighboring cell/neighboring TRP.

In some implementations, that the spatial relation information is associated with the reference signal of the neighboring cell/neighboring TRP mentioned in this example may be that the reference signal included in the spatial relation information belongs to the neighboring cell/neighboring TRP. For example, the configuration information of the reference signal included in the spatial relation information includes the identifier information of the neighboring cell/neighboring TRP.

In some implementations, that the QCL information is associated with the reference signal of the neighboring cell/neighboring TRP mentioned in this example may be that the reference signal included in the QCL information belongs to the neighboring cell/neighboring TRP. For example, the configuration information of the reference signal included in the QCL information includes the identifier information of the neighboring cell/neighboring TRP.

3) Downlink Control Information (DCI)/a COntrol REsource SET (CORESET)/TCI of a control channel/spatial relation information/QCL information for scheduling the reference signal is associated with the reference signal of the neighboring cell/neighboring TRP.

For example, the DCI/CORESET/control channel for scheduling the reference signal has TCI/spatial relation information/QCL information. The configuration information of the reference signal included in the TCI/spatial relation information/QCL information includes the identifier information of the neighboring cell/neighboring TRP.

4) The DCI/CORESET/control channel for scheduling the reference signal belongs to the neighboring cell/neighboring TRP. For example, the configuration information of the DCI/CORESET/control channel for scheduling the reference signal includes the identifier information of the neighboring cell/neighboring TRP.

The Layer 1 (L1) beam measurement mentioned in the embodiments of this specification includes at least one of the following: layer 1 Reference Signal Received Power (RSRP) measurement; layer 1 Signal to Interference and Noise Ratio (SINR) measurement; layer 1 Reference Signal Received Quality (RSRQ) measurement; beam failure measurement for beam failure recovery; and candidate beam measurement for beam failure recovery.

In order to explain the measurement restriction conditions mentioned in the previous embodiments in detail, the following will first explain the meaning of some of these terms.

As for the first cell and the second cell, where at least one of the first cell and the second cell is the neighboring cell/neighboring TRP described in the previous embodiment, and the "cell" in the first cell and the second cell can be understood as including the cell/TRP.

In some implementations, the first cell and the second cell meet one of the following:

1) The first cell is a current cell or a current TRP, and the second cell is a neighboring cell or a neighboring TRP. For example, the first cell is a current cell, and the second cell is a neighboring cell; for another example, the first cell is a current TRP, and the second cell is a neighboring TRP; for still another example, the first cell is a current cell, and the second cell is a neighboring TRP; for yet another example, the first cell is a current TRP, and the second cell is a neighboring cell.

2) The first cell is a neighboring cell or a neighboring TRP, and the second cell is a current cell or a current TRP. For example, the first cell is a neighboring cell, and the second cell is a current cell; for another example, the first cell is a neighboring TRP, and the second cell is a current TRP; for still another example, the first cell is a neighboring cell, and the second cell is a current TRP; for yet another example, the first cell is a neighboring TRP, and the second cell is a current cell.

3) The first cell is a neighboring cell or a neighboring TRP, and the second cell is the neighboring cell or the neighboring TRP. For example, the first cell is a neighboring cell, and the second cell is also the neighboring cell; for another example, the first cell is a neighboring TRP, and the second cell is also the neighboring TRP; for still another example, the first cell is a neighboring cell, and the second cell is a neighboring TRP; for yet another example, the first cell is a neighboring TRP, and the second cell is a neighboring cell.

4) The first cell is a neighboring cell or a neighboring TRP, and the second cell is another neighboring cell or another neighboring TRP. For example, the first cell is a neighboring cell, and the second cell is another neighboring cell; for another example, the first cell is a neighboring TRP, and the second cell is another neighboring TRP; for still another example, the first cell is a neighboring cell, and the second cell is a neighboring TRP; for yet another example, the first cell is a neighboring TRP, and the second cell is a neighboring cell.

The signal of the first cell conflicts with the signal of the second cell, where the signal of the first cell and the signal of the second cell occupy a same time domain unit (such as the symbol, the Orthogonal Frequency Division Multiplexing (OFDM) symbol, the data symbol, and the like), which can be referred to as the conflict. The signal of the first cell includes one of the following: the SSB, the CSI-RS, the SRS, the TRS, and the PTRS: and the signal of the second cell includes one of the following: the SSB, the CSI-RS, the SRS, the TRS, and the PTRS.

In this way, before S202, the terminal may further determine whether the signal of the first cell conflicts with the signal of the second cell. If the signal of the first cell and the signal of the second cell are in a same time domain unit, it is determined that the signal of the first cell conflicts with the signal of the second cell.

In some implementations, whether the signal of the first cell conflicts with the signal of the second cell refers to whether an OFDM symbol where the signal of the first cell is actually located conflicts with an OFDM symbol where the signal of the second cell is actually located after considering timing information of the two cells.

For example, if timing information of the second cell lags behind that of the serving cell, when signals of the two cells conflict, from the timing information of the first cell, the conflicting OFDM symbols include the current OFDM symbol and following K OFDM symbols. In some implementations, K=1; or K is determined based on the timing information; or K is configured by a network/reported by UE/defaulted in a protocol.

For another example, if timing information of the second cell is ahead of that of the serving cell, when signals of the two cells conflict, from the timing information of the first cell, the conflicting OFDM symbols include the current OFDM symbol and previous L OFDM symbols. In some implementations, L=1; or L is determined based on the timing information; or L is configured by a network/reported by UE/defaulted in a protocol.

In some implementations, the foregoing case may also be considered from the timing information of the second cell, and details are not described herein again.

For still another example, when a timing information gap between the two cells is less than a specific threshold, the conflicting OFDM symbol only includes the current OFDM symbol. The threshold may be defaulted in a protocol, configured by a network, or a terminal capability. For example, capabilities of terminals are different, and capabilities of terminals to handle the timing information gap are also different. The terminal may report this capability to the network.

In some implementations, whether the signal of the first cell conflicts with the signal of the second cell is determined based on whether the signal of the second cell is in a restriction interval. The restriction interval may be determined based on at least one of the following:
1) The restriction interval is determined based on a symbol where the RS of the first cell is located.
2) The restriction interval is determined based on a symbol where the RS of the first cell is located and K symbols previous to the symbol, where K is a positive integer.
3) The restriction interval is determined based on a symbol where the RS of the first cell is located and L symbols after the symbol, where L is a positive integer.
4) The restriction interval is determined based on a symbol where the RS of the first cell is located, K symbols previous to the symbol, and L symbols after the symbol.

When a SubCarrier Spacing (SCS) of the first cell is different from that of the second cell, the restriction interval meets any of the following: the restriction interval is calculated based on the symbol of the first cell; and the restriction interval is calculated based on the symbol of the second cell. The restriction interval is determined based on the timing information of the two cells.

Whether the signal of the first cell conflicts with the signal of the second cell mentioned above includes at least one of the following:
1) Whether there is a conflict during sending of the DownLink (DL) network side device.
2) Whether there is a conflict during receiving of the DL terminal.
3) Whether there is a conflict during receiving of the UpLink (UL) network side device (mainly for uplink reference signals such as the SRS).
4) Whether there is a conflict during sending of the UL terminal (mainly for uplink reference signals such as the SRS).

After the first cell and the second cell are defined, and the conflict between the signal of the first cell and the signal of the second cell is explained, the measurement restriction conditions described in the previous embodiments will be described in detail in several embodiments below.

Embodiment 1

The measurement restriction condition includes: when an SSB of a first cell conflicts with an SSB/CSI-RS of a second cell, at least one of the following 1 and 2 is performed:
1. On an FR 1 frequency band, the terminal performs measurement on the SSB of the first cell without a restriction condition. Or on the FR 1 frequency band, the terminal performs measurement on one of the SSB of the first cell and the SSB/CSI-RS of the second cell. In some implementations, the SSB of the first cell (used for L1 beam measurement) is expected to have a longer measurement periodicity.
2. On an FR 2 frequency band, the terminal performs measurement on one of the SSB of the first cell and the SSB/CSI-RS of the second cell. In some implementations, the SSB of the first cell (used for L1 beam measurement) is expected to have a longer measurement periodicity.

In this embodiment, "without a restriction condition" may be understood as a special case of the measurement restriction condition.

In this embodiment, the SSB of the first cell is used for L1 beam measurement; the SSB/CSI-RS of the second cell may be used for at least one of the following: Radio Link Management (RLM), Beam Failure Detection (BFD), Candidate Beam Detection (CBD), and L1 beam measurement.

At least one of the first cell and the second cell in this embodiment is the neighboring cell/neighboring TRP described in previous embodiments, for example, the first cell is the neighboring cell/neighboring TRP described in previous embodiments.

In some implementations, as mentioned in 1: on an FR 1 frequency band, that the terminal performs measurement on the SSB of the first cell without a restriction condition is performed when at least one of the following is met:
1) The SSB of the first cell and the SSB/CSI-RS of the second cell have a same SCS.
2) The first cell and the second cell belong to different cells, and timing information of the first cell and timing information of the second cell meet a preset timing condition.
3) The SSB of the first cell and the SSB/CSI-RS of the second cell have different SCSs, and the terminal supports receiving data and an SSB simultaneously under different parameter sets (that is, supporting simultaneousRxDataSSB-DiffNumerology) or has a similar capability.

That timing information of the first cell and timing information of the second cell meet a preset timing condition mentioned in 2) includes, for example: a timing information gap between the two cells is less than a specific threshold, or within a specific range, the threshold/range is configured by the network side device, specified in a protocol, or reported by the terminal; or the terminal supports a specific degree of channel/signal reception capability with different timing information, and currently, the timing information of the first cell and the timing information of the second cell are both within the capability range.

In some implementations, as mentioned in 1, on the FR 1 frequency band, that the terminal performs measurement on one of the SSB of the first cell and the SSB/CSI-RS of the second cell is performed when at least one of the following is met:
1) The SSB of the first cell and the SSB/CSI-RS of the second cell have a same SCS, the first cell and the second cell belong to different cells, and timing information of the first cell and timing information of the second cell do not meet a preset timing condition. For example, the timing information gap between the two cells is greater than or equal to a specific threshold.
2) The SSB of the first cell and the SSB/CSI-RS of the second cell have different SCSs, the terminal supports simultaneousRxDataSSB-DiffNumerology, the first cell and the second cell belong to different cells, and timing information of the first cell and timing information of the second cell do not meet a preset timing condition.
3) The SSB of the first cell and the SSB/CSI-RS of the second cell have different SCSs, and the terminal does not support simultaneousRxDataSSB-DiffNumerology.
4) The first cell and the second cell belong to different cells.

Embodiment 2

The measurement restriction condition includes: on an FR 1 frequency band, if a CSI-RS of a first cell conflicts with an SSB of a second cell, and the SSB of the second cell is within an activated BandWidth Part (BWP), at least one of the following is performed:

1. In a case that the SSB of the second cell and the CSI-RS of the first cell have a same SCS, the terminal performs measurement on the CSI-RS of the first cell without a restriction condition.
2. In a case that the SSB of the second cell and the CSI-RS of the first cell have different SCSs, the terminal performs measurement on the CSI-RS of the first cell without a restriction condition. Or the terminal performs measurement on one of the CSI-RS of the first cell and the SSB of the second cell. In some implementations, the SSB of the first cell (used for L1 beam measurement) is expected to have a longer measurement periodicity.

The CSI-RS of the first cell is used for L1 beam measurement, and the SSB of the second cell is used for at least one of the following: RLM/BFD/CBD/L1 beam measurement.

At least one of the first cell and the second cell is the neighboring cell/neighboring TRP In some implementations, in a case that the SSB of the second cell and the CSI-RS of the first cell have a same SCS, that the terminal performs measurement on the CSI-RS of the first cell without a restriction condition mentioned in 1 is performed when the following is met: the first cell and the second cell belong to different cells, and timing information of the first cell and timing information of the second cell meet a preset timing condition. Examples can be found in the previous description.

In some implementations, in a case that the SSB of the second cell and the CSI-RS of the first cell have different SCSs, that the terminal performs measurement on the CSI-RS of the first cell without a restriction condition mentioned in 2 is performed when at least one of the following is met:
  1) The terminal supports simultaneousRxDataSSB-DiffNumerology.
  2) The first cell and the second cell belong to different cells, and timing information of the first cell and timing information of the second cell meet a preset timing condition. Examples can be found in the previous description.

In some implementations, in a case that the SSB of the second cell and the CSI-RS of the first cell have different SCSs, that the terminal performs measurement on one of the CSI-RS of the first cell and the SSB of the second cell mentioned in 2 is performed when at least one of the following is met:
  1) The terminal does not support simultaneousRxDataSSB-DiffNumerology.
  2) The first cell and the second cell belong to different cells, and timing information of the first cell and timing information of the second cell do not meet a preset timing condition. Examples can be found in the previous description.
  3) The first cell and the second cell belong to different cells.

Embodiment 3

The measurement restriction condition includes: on an FR 1 frequency band, in a case that a CSI-RS of a first cell conflicts with a CSI-RS of a second cell, performing, by the terminal, measurement on the CSI-RS of the first cell without a restriction condition, where the CSI-RS of the first cell is used for L1 beam measurement, and the CSI-RS of the second cell is used for at least one of the following: RLM/BFD/CBD/L1 beam measurement. At least one of the first cell and the second cell is the neighboring cell/neighboring TRP.

In some implementations, the first cell and the second cell belong to different cells, and timing information of the first cell and timing information of the second cell meet a preset timing condition. Examples can be found in the previous description.

Embodiment 4

The measurement restriction condition includes: on an FR 2 frequency band, in a case that a CSI-RS of a first cell conflicts with an SSB of a second cell, performing, by the terminal, measurement on one of the CSI-RS of the first cell and the SSB of the second cell, where the CSI-RS of the first cell is used for L1 beam measurement, and the SSB of the second cell is used for at least one of the following: RLM/BFD/CBD/L1 beam measurement. At least one of the first cell and the second cell is the neighboring cell/neighboring TRP.

In some implementations, the SSB of the first cell (used for L1 beam measurement) is expected to have a longer measurement periodicity.

Embodiment 5

The measurement restriction condition includes: on an FR 2 frequency band, in a case that a CSI-RS of a first cell conflicts with a CSI-RS of a second cell, performing, by the terminal, measurement on one of the CSI-RS of the first cell and the SSB of the second cell in a case that one of the following is met:
  1) The first cell and the second cell are different cells, and timing information of the first cell and timing information of the second cell do not meet a timing condition. Examples can be found in the previous description.
  2) The first cell and the second cell are different cells.

In some implementations, the SSB of the first cell (used for L1 beam measurement) is expected to have a longer measurement periodicity.

The CSI-RS of the first cell is used for L1 beam measurement, and the CSI-RS of the second cell is used for at least one of the following: RLM/BFD/CBD/L1 beam measurement. At least one of the first cell and the second cell is the neighboring cell/neighboring TRP.

The method for measuring a reference signal according to the embodiments of this application is described in detail above with reference to FIG. 2. The method for measuring a reference signal according to another embodiment of this application will be described in detail below with reference to FIG. 3. It can be understood that interaction between a network side device and a terminal described on the network side device is the same as that described on the terminal side in the method shown in FIG. 2. To avoid repetition, relevant descriptions are appropriately omitted.

FIG. 3 is a schematic flowchart for implementing a method for measuring a reference signal according to an embodiment of this application, and the method may be applied to the network side device. As shown in FIG. 3, the method 300 includes the following steps.

S302: A network side device receives a measurement result, where the measurement result is obtained by a terminal performing L1 measurement on a reference signal of a neighboring cell/neighboring TRP based on a measurement restriction condition.

In the embodiments of this application, the terminal may perform L1 measurement on the reference signal of the neighboring cell/neighboring TRP based on a measurement restriction condition to obtain a measurement result, and send the measurement result to the network side device, which solves the problem that the terminal cannot effectively perform L1 measurement on the reference signal of the neighboring cell due to the lack of measurement restriction in the related art, which is not conducive to mobility management, so that it is convenient to coordinate inter-cell/TRP interference, improve system capacity, and improve user experience.

In some implementations, as an embodiment, the method 300 further includes: sending, by the network side device, indication information, where the indication information is used for indicating a periodicity and a position of the reference signal.

In some implementations, as an embodiment, the measurement restriction condition includes: when an SSB of a first cell conflicts with an SSB/CSI-RS of a second cell: on an FR 1 frequency band, performing, by the terminal, measurement on the SSB of the first cell without a restriction condition; or performing, by the terminal, measurement on one of the SSB of the first cell and the SSB/CSI-RS of the second cell; and/or on an FR 2 frequency band, performing, by the terminal, measurement on one of the SSB of the first cell and the SSB/CSI-RS of the second cell, where the SSB of the first cell is used for L1 beam measurement, and at least one of the first cell and the second cell is the neighboring cell/neighboring TRP.

In some implementations, as an embodiment, the measurement restriction condition includes: on an FR 1 frequency band, a CSI-RS of a first cell conflicts with an SSB of a second cell, and the SSB of the second cell is within an activated BWP: in a case that the SSB of the second cell and the CSI-RS of the first cell have a same SCS, performing, by the terminal, measurement on the CSI-RS of the first cell without a restriction condition; and/or in a case that the SSB of the second cell and the CSI-RS of the first cell have different SCSs, performing, by the terminal, measurement on the CSI-RS of the first cell without a restriction condition; or performing, by the terminal, measurement on one of the CSI-RS of the first cell and the SSB of the second cell, where the CSI-RS of the first cell is used for L1 beam measurement, and at least one of the first cell and the second cell is the neighboring cell/neighboring TRP.

In some implementations, as an embodiment, the measurement restriction condition includes: on an FR 1 frequency band, in a case that a CSI-RS of a first cell conflicts with a CSI-RS of a second cell, performing, by the terminal, measurement on the CSI-RS of the first cell without a restriction condition, where the CSI-RS of the first cell is used for L1 beam measurement, and at least one of the first cell and the second cell is the neighboring cell/neighboring TRP.

In some implementations, as an embodiment, the measurement restriction condition includes: on an FR 2 frequency band, in a case that a CSI-RS of a first cell conflicts with an SSB of a second cell, performing, by the terminal, measurement on one of the CSI-RS of the first cell and the SSB of the second cell, where the CSI-RS of the first cell is used for L1 beam measurement, and at least one of the first cell and the second cell is the neighboring cell/neighboring TRP.

In some implementations, as an embodiment, the measurement restriction condition includes: on an FR 2 frequency band, in a case that a CSI-RS of a first cell conflicts with a CSI-RS of a second cell, performing, by the terminal, measurement on one of the CSI-RS of the first cell and the SSB of the second cell in a case that one of the following is met: the first cell and the second cell are different cells, and timing information of the first cell and timing information of the second cell do not meet a timing condition; and the first cell and the second cell are different cells, where the CSI-RS of the first cell is used for L1 beam measurement, and at least one of the first cell and the second cell is the neighboring cell/neighboring TRP.

Figure 4:
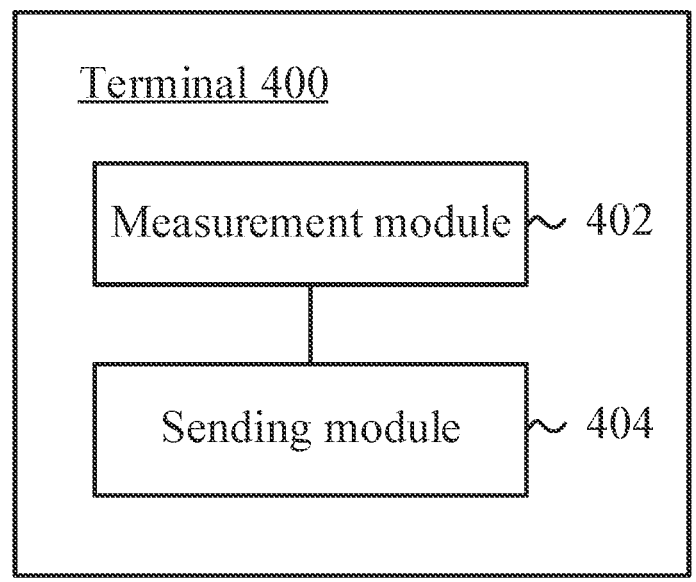
FIG. 4 is a schematic structural diagram of a terminal according to an embodiment of this application.

FIG. 4 is a schematic structural diagram of a terminal according to an embodiment of this application. As shown in FIG. 4, the terminal 400 includes the following module:
   a measurement module 402, configured to perform L1 measurement on a reference signal of a neighboring cell/neighboring TRP based on a measurement restriction condition to obtain a measurement result; and
   a sending module 404, configured to send the measurement result.

In the embodiments of this application, the terminal may perform L1 measurement on the reference signal of the neighboring cell/neighboring TRP based on a measurement restriction condition to obtain a measurement result, and send the measurement result to the network side device, which solves the problem that the terminal cannot effectively perform L1 measurement on the reference signal of the neighboring cell due to the lack of measurement restriction in the related art, which is not conducive to mobility management, so that it is convenient to coordinate inter-cell/TRP interference, improve system capacity, and improve user experience.

In some implementations, as an embodiment, the terminal 400 further includes a receiving module, configured to receive indication information, where the indication information is used for indicating a periodicity and a position of the reference signal.

In some implementations, as an embodiment, the measurement module 402 may be configured to: perform L1 measurement on the reference signal of the neighboring cell/neighboring TRP within a measurement time configuration of the reference signal; or perform L1 measurement on the reference signal of the neighboring cell/neighboring TRP within and outside a measurement time configuration of the reference signal.

In some implementations, as an embodiment, the measurement restriction condition includes: when a Synchronization Signal and PBCH Block (SSB) of a first cell conflicts with an SSB/Channel State Information-Reference Signal (CSI-RS) of a second cell: on an FR 1 frequency band, performing, by the terminal, measurement on the SSB of the first cell without a restriction condition; or performing, by the terminal, measurement on one of the SSB of the first cell and the SSB/CSI-RS of the second cell; and/or on an FR 2 frequency band, performing, by the terminal, measurement on one of the SSB of the first cell and the SSB/CSI-RS of the second cell, where the SSB of the first cell is used for L1 beam measurement, and at least one of the first cell and the second cell is the neighboring cell/neighboring TRP.

In some implementations, as an embodiment, on an FR 1 frequency band, the performing, by the terminal, measurement on the SSB of the first cell without a restriction condition is performed when at least one of the following is met: the SSB of the first cell and the SSB/CSI-RS of the second cell have a same SCS; the first cell and the second cell belong to different cells, and timing information of the first cell and timing information of the second cell meet a preset timing condition; and the SSB of the first cell and the SSB/CSI-RS of the second cell have different SCSs, and the terminal supports receiving data and an SSB simultaneously under different parameter sets, namely, simultaneousRxDataSSB-DiffNumerology.

In some implementations, as an embodiment, on an FR 1 frequency band, the performing, by the terminal, measurement on one of the SSB of the first cell and the SSB/CSI-RS of the second cell is performed when at least one of the following is met: the SSB of the first cell and the SSB/CSI-RS of the second cell have a same SCS, the first cell and the second cell belong to different cells, and timing information of the first cell and timing information of the second cell do not meet a preset timing condition; the SSB of the first cell and the SSB/CSI-RS of the second cell have different SCSs, the terminal supports simultaneousRxDataSSB-DiffNumerology, the first cell and the second cell belong to different cells, and timing information of the first cell and timing information of the second cell do not meet a preset timing condition; the SSB of the first cell and the SSB/CSI-RS of the second cell have different SCSs, and the terminal does not support simultaneousRxDataSSB-DiffNumerology; and the first cell and the second cell belong to different cells.

In some implementations, as an embodiment, the measurement restriction condition includes: on an FR 1 frequency band, a CSI-RS of a first cell conflicts with an SSB of a second cell, and the SSB of the second cell is within an activated BandWidth Part (BWP): in a case that the SSB of the second cell and the CSI-RS of the first cell have a same SCS, performing, by the terminal, measurement on the CSI-RS of the first cell without a restriction condition; and/or in a case that the SSB of the second cell and the CSI-RS of the first cell have different SCSs, performing, by the terminal, measurement on the CSI-RS of the first cell without a restriction condition; or performing, by the terminal, measurement on one of the CSI-RS of the first cell and the SSB of the second cell, where the CSI-RS of the first cell is used for L1 beam measurement, and at least one of the first cell and the second cell is the neighboring cell/neighboring TRP.

In some implementations, as an embodiment, in a case that the SSB of the second cell and the CSI-RS of the first cell have a same SCS, the performing, by the terminal, measurement on the CSI-RS of the first cell without a restriction condition is performed when the following is met: the first cell and the second cell belong to different cells, and timing information of the first cell and timing information of the second cell meet a preset timing condition.

In some implementations, as an embodiment, in a case that the SSB of the second cell and the CSI-RS of the first cell have different SCSs, the performing, by the terminal, measurement on the CSI-RS of the first cell without a restriction condition is performed when at least one of the following is met: the terminal supports simultaneousRxDataSSB-DiffNumerology; and the first cell and the second cell belong to different cells, and timing information of the first cell and timing information of the second cell meet a preset timing condition.

In some implementations, as an embodiment, in a case that the SSB of the second cell and the CSI-RS of the first cell have different SCSs, the performing, by the terminal, measurement on one of the CSI-RS of the first cell and the SSB of the second cell is performed when at least one of the following is met: the terminal does not support simultaneousRxDataSSB-DiffNumerology; the first cell and the second cell belong to different cells, and timing information of the first cell and timing information of the second cell do not meet a preset timing condition; and the first cell and the second cell belong to different cells.

In some implementations, as an embodiment, the measurement restriction condition includes: on an FR 1 frequency band, in a case that a CSI-RS of a first cell conflicts with a CSI-RS of a second cell, performing, by the terminal, measurement on the CSI-RS of the first cell without a restriction condition, where the CSI-RS of the first cell is used for L1 beam measurement, and at least one of the first cell and the second cell is the neighboring cell/neighboring TRP.

In some implementations, as an embodiment, the first cell and the second cell belong to different cells, and timing information of the first cell and timing information of the second cell meet a preset timing condition.

In some implementations, as an embodiment, the measurement restriction condition includes: on an FR 2 frequency band, in a case that a CSI-RS of a first cell conflicts with an SSB of a second cell, performing, by the terminal, measurement on one of the CSI-RS of the first cell and the SSB of the second cell, where the CSI-RS of the first cell is used for L1 beam measurement, and at least one of the first cell and the second cell is the neighboring cell/neighboring TRP.

In some implementations, as an embodiment, the measurement restriction condition includes: on an FR 2 frequency band, in a case that a CSI-RS of a first cell conflicts with a CSI-RS of a second cell, performing, by the terminal, measurement on one of the CSI-RS of the first cell and the SSB of the second cell in a case that one of the following is met: the first cell and the second cell are different cells, and timing information of the first cell and timing information of the second cell do not meet a timing condition; and the first cell and the second cell are different cells, where the CSI-RS of the first cell is used for L1 beam measurement, and at least one of the first cell and the second cell is the neighboring cell/neighboring TRP.

In some implementations, as an embodiment, the first cell and the second cell meet one of the following: the first cell is a current cell/current TRP, and the second cell is a neighboring cell/neighboring TRP; the first cell is a neighboring cell/neighboring TRP, and the second cell is a current cell/current TRP; the first cell is a neighboring cell/neighboring TRP, and the second cell is the neighboring cell/neighboring TRP; and the first cell is a neighboring cell/neighboring TRP, and the second cell is another neighboring cell/neighboring TRP.

In some implementations, as an embodiment, the terminal further includes a determining module, configured to: in a case that a signal of the first cell and a signal of the second cell are in a same time domain unit, determine that the signal of the first cell conflicts with the signal of the second cell.

In some implementations, as an embodiment, a reference signal of the neighboring cell/neighboring TRP meets at least one of the following: configuration information of a reference signal of the terminal is configured with cell identifier information of the neighboring cell/neighboring TRP; a Transmission Configuration Indicator (TCI)/spatial relation information/Quasi-Co-Location (QCL) information of the terminal is associated with the reference signal of the neighboring cell/neighboring TRP; Downlink Control Information (DCI)/a COntrol REsource SET (CORESET)/TCI of a control channel/spatial relation information/QCL information for scheduling the reference signal is associated with the reference signal of the neighboring cell/neighboring TRP;

and DCI/a CORESET/a control channel for scheduling the reference signal belongs to the neighboring cell/neighboring TRP.

In some implementations, as an embodiment, the reference signal includes at least one of the following: an SSB; a CSI-RS; an SRS; a Tracking Reference Signal (TRS); and a Phase Tracking Reference Signal (PTRS).

For the terminal 400 according to the embodiments of this application, refer to the procedure corresponding to the method 200 according to the embodiments of this application. Furthermore, each unit/module of the terminal 400 and the foregoing other operations and/or functions are used to implement the corresponding procedure of the method 200, and a same or equivalent technical effect can be achieved. For brevity, details are not described herein again.

The terminal mentioned in this embodiment of this application may also be a component, an integrated circuit, or a chip in the terminal. The apparatus may be a mobile terminal, or a non-mobile terminal. For example, the mobile terminal may include, but is not limited to, a type of the terminal 11 listed above. The non-mobile terminal may be a server, a Network Attached Storage (NAS), a personal computer, a television, a teller machine, or a self-service machine. This is not specifically limited in this embodiment of this application.

The terminal in this embodiment of this application may be an apparatus with an operating system. The operating system may be an Android operating system, an iOS operating system, or another possible operating system. This is not specifically limited in the embodiments of this application.

The terminal provided in this embodiment of this application can implement the processes implemented in the method embodiment of FIG. 2, and a same technical effect can be achieved. To avoid repetition, details are not described herein again.

Figure 5:
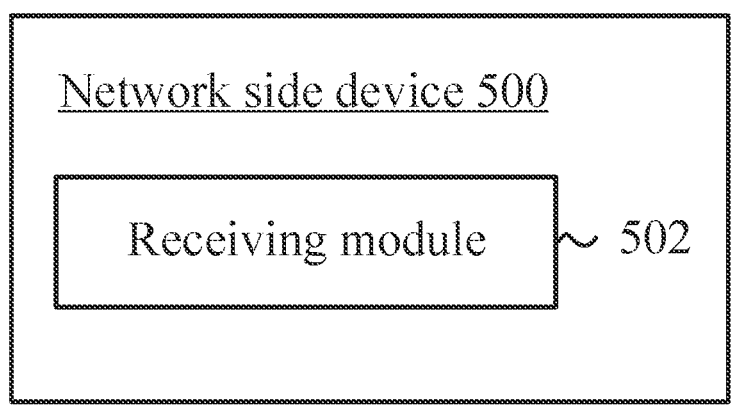
FIG. 5 is a schematic structural diagram of a network side device according to another embodiment of this application.

FIG. 5 is a schematic structural diagram of a network side device according to an embodiment of this application. As shown in FIG. 5, the network side device 500 includes the following module:
  a receiving module 502, configured to receive a measurement result, where the measurement result is obtained by a terminal performing L1 measurement on a reference signal of a neighboring cell/neighboring TRP based on a measurement restriction condition.

In the embodiments of this application, the terminal may perform L1 measurement on the reference signal of the neighboring cell/neighboring TRP based on a measurement restriction condition to obtain a measurement result, and send the measurement result to the network side device, which solves the problem that the terminal cannot effectively perform L1 measurement on the reference signal of the neighboring cell due to the lack of measurement restriction in the related art, which is not conducive to mobility management, so that it is convenient to coordinate inter-cell/TRP interference, improve system capacity, and improve user experience.

In some implementations, as an embodiment, the method 300 further includes: sending indication information, where the indication information is used for indicating a periodicity and a position of the reference signal.

In some implementations, as an embodiment, the measurement restriction condition includes: when an SSB of a first cell conflicts with an SSB/CSI-RS of a second cell: on an FR 1 frequency band, performing, by the terminal, measurement on the SSB of the first cell without a restriction condition; or performing, by the terminal, measurement on one of the SSB of the first cell and the SSB/CSI-RS of the second cell; and/or on an FR 2 frequency band, performing, by the terminal, measurement on one of the SSB of the first cell and the SSB/CSI-RS of the second cell, where the SSB of the first cell is used for L1 beam measurement, and at least one of the first cell and the second cell is the neighboring cell/neighboring TRP.

In some implementations, as an embodiment, the measurement restriction condition includes: on an FR 1 frequency band, a CSI-RS of a first cell conflicts with an SSB of a second cell, and the SSB of the second cell is within an activated BWP: in a case that the SSB of the second cell and the CSI-RS of the first cell have a same SCS, performing, by the terminal, measurement on the CSI-RS of the first cell without a restriction condition; and/or in a case that the SSB of the second cell and the CSI-RS of the first cell have different SCSs, performing, by the terminal, measurement on the CSI-RS of the first cell without a restriction condition; or performing, by the terminal, measurement on one of the CSI-RS of the first cell and the SSB of the second cell, where the CSI-RS of the first cell is used for L1 beam measurement, and at least one of the first cell and the second cell is the neighboring cell/neighboring TRP.

In some implementations, as an embodiment, the measurement restriction condition includes: on an FR 1 frequency band, in a case that a CSI-RS of a first cell conflicts with a CSI-RS of a second cell, performing, by the terminal, measurement on the CSI-RS of the first cell without a restriction condition, where the CSI-RS of the first cell is used for L1 beam measurement, and at least one of the first cell and the second cell is the neighboring cell/neighboring TRP.

In some implementations, as an embodiment, the measurement restriction condition includes: on an FR 2 frequency band, in a case that a CSI-RS of a first cell conflicts with an SSB of a second cell, performing, by the terminal, measurement on one of the CSI-RS of the first cell and the SSB of the second cell, where the CSI-RS of the first cell is used for L1 beam measurement, and at least one of the first cell and the second cell is the neighboring cell/neighboring TRP.

In some implementations, as an embodiment, the measurement restriction condition includes: on an FR 2 frequency band, in a case that a CSI-RS of a first cell conflicts with a CSI-RS of a second cell, performing, by the terminal, measurement on one of the CSI-RS of the first cell and the SSB of the second cell in a case that one of the following is met: the first cell and the second cell are different cells, and timing information of the first cell and timing information of the second cell do not meet a timing condition; and the first cell and the second cell are different cells, where the CSI-RS of the first cell is used for L1 beam measurement, and at least one of the first cell and the second cell is the neighboring cell/neighboring TRP.

For the network side device 500 according to this embodiment of this application, refer to the procedure corresponding to the method 300 according to an embodiment of this application. Furthermore, each unit/module of the network side device 500 and the foregoing other operations and/or functions are used to respectively implement the corresponding procedure of the method 300, and a same or equivalent technical effect can be achieved. For brevity, details are not described herein again.

Figure 6:
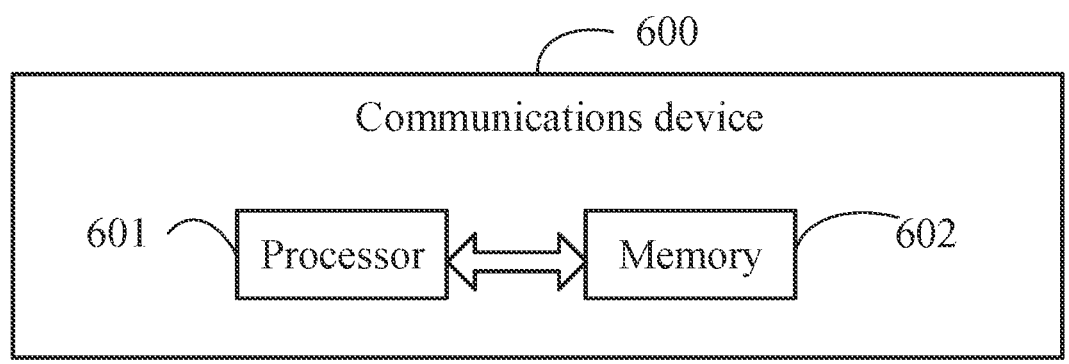
FIG. 6 is a schematic structural diagram of a communications device according to an embodiment of this application.

In some implementations, as shown in FIG. 6, an embodiment of this application further provides a communications device 600, including a processor 601, a memory 602, a program or an instruction stored in the memory 602 and executable on the processor 601. For example, when the communications device 600 is a terminal, the program or the instruction is executed by the processor 601 to implement the processes in the embodiment of the method for measuring a reference signal, and a same technical effect can be achieved. When the communications device 600 is a network side device, the program or the instruction is executed by the processor 601 to implement the processes in the embodiment of the method for measuring a reference signal, and a same technical effect can be achieved. To avoid repetition, details are not described herein again.

Figure 7:
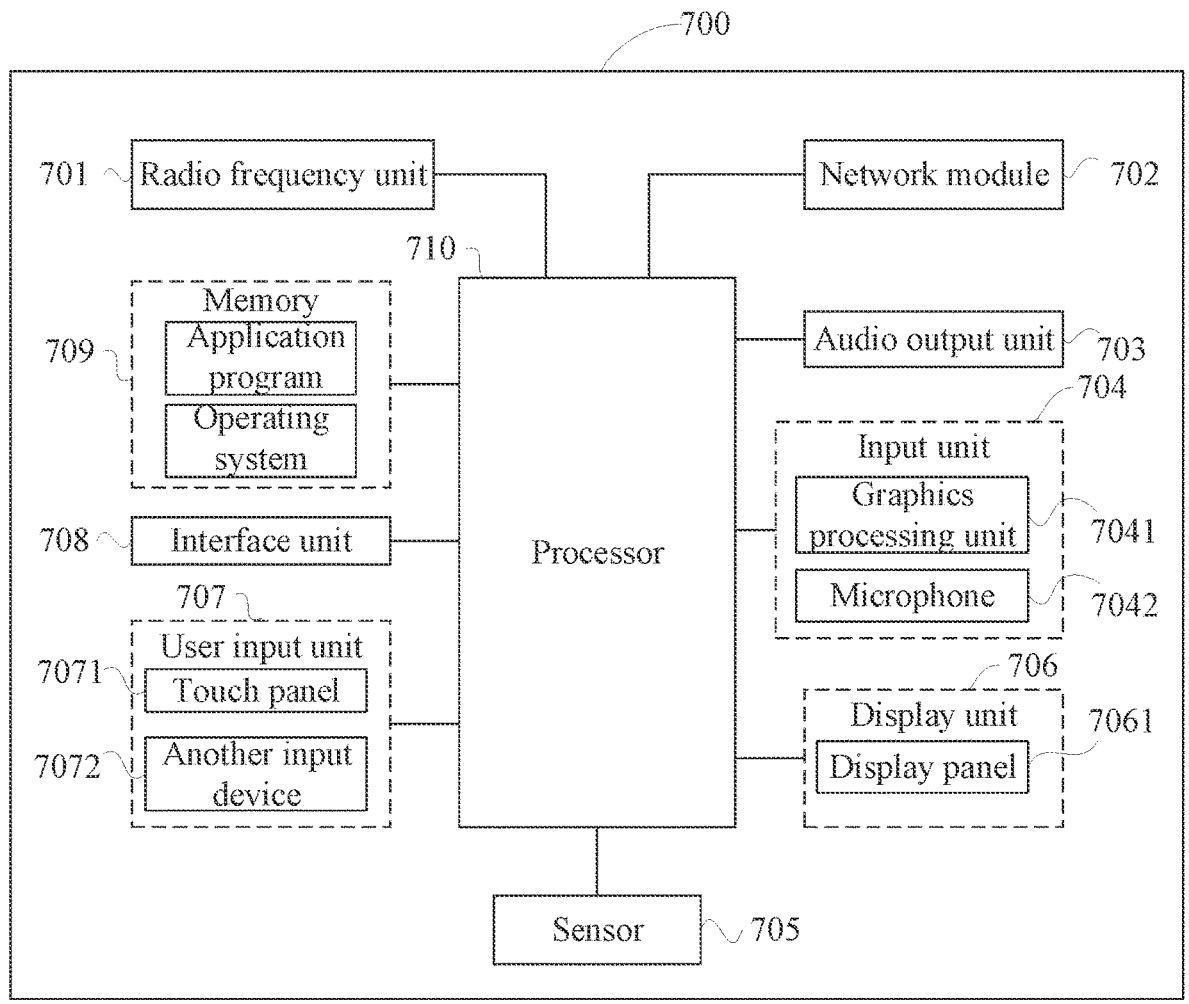
FIG. 7 is a schematic structural diagram of a terminal according to an embodiment of this application.

FIG. 7 is a schematic diagram of a hardware structure of a terminal according to an embodiment of this application.

The terminal 700 includes but is not limited to components such as a radio frequency unit 701, a network module 702, an audio output unit 703, an input unit 704, a sensor 705, a display unit 706, a user input unit 707, an interface unit 708, a memory 709, and a processor 710.

It may be understood by a person skilled in the art that the terminal 700 may further include a power supply (such as a battery) that supplies power to each component. The power supply may be logically connected to the processor 710 by using a power management system, to implement functions such as charging, discharging, and power consumption management by using the power management system. The terminal structure shown in FIG. 7 constitutes no limitation on the terminal, and the terminal may include more or fewer components than those shown in the figure, or combine some components, or have different component arrangements. Details are not described herein.

It should be understood that, in the embodiments of this application, the input unit 704 may include a Graphics Processing Unit (GPU) 7041 and a microphone 7042, and the graphics processing unit 7041 processes image data of a still picture or video obtained by an image capture apparatus (such as a camera) in a video capture mode or an image capture mode. The display unit 706 may include a display panel 7061, and the display panel 7061 may be configured in a form of a liquid crystal display, an organic light emitting diode, or the like. The user input unit 707 includes a touch panel 7071 and another input device 7072. The touch panel 7071 is also referred to as a touch screen. The touch panel 7071 may include two parts: a touch detection apparatus and a touch controller. The another input device 7072 may include but is not limited to a physical keyboard, a functional button (such as a volume control button or a power on/off button), a trackball, a mouse, and a joystick. Details are not described herein.

In this embodiment of this application, the radio frequency unit 701 receives downlink data from a network side device and then sends the downlink data to the processor 710 for processing; and sends uplink data to the network side device. Usually, the radio frequency unit 701 includes but is not limited to an antenna, at least one amplifier, a transceiver, a coupler, a low noise amplifier, a duplexer, and the like.

The memory 709 may be configured to store a software program or an instruction and various data. The memory 709 may mainly include a program or instruction storage area and a data storage area. The program or instruction storage area may store an operating system, and an application program or an instruction required by at least one function (for example, a sound playing function or an image playing function). In addition, the memory 709 may include a high-speed random access memory, and may further include a non-volatile memory. The non-volatile memory may be a Read-Only Memory (ROM), a Programmable ROM (PROM), an Erasable PROM (EPROM), an Electrically EPROM (EEPROM), or a flash memory, for example, at least one disk storage component, a flash memory component, or another non-volatile solid-state storage component.

The processor 710 may include one or more processing units. In some implementations, an application processor and a modem processor may be integrated into the processor 710. The application processor mainly processes an operating system, a user interface, an application program, an instruction, or the like. The modem processor mainly processes wireless communications, for example, a baseband processor. It can be understood that, alternatively, the modem processor may not be integrated into the processor 710.

The processor 710 is configured to perform L1 measurement on a reference signal of a neighboring cell/neighboring Transmission and Reception Point (TRP) based on a measurement restriction condition to obtain a measurement result; and the radio frequency unit 701 is configured to send the measurement result.

In the embodiments of this application, the terminal may perform L1 measurement on the reference signal of the neighboring cell/neighboring TRP based on a measurement restriction condition to obtain a measurement result, and send the measurement result to the network side device, which solves the problem that the terminal cannot effectively perform L1 measurement on the reference signal of the neighboring cell due to the lack of measurement restriction in the related art, which is not conducive to mobility management, so that it is convenient to coordinate inter-cell/TRP interference, improve system capacity, and improve user experience.

The terminal provided in this embodiment of this application can implement the processes in the embodiment of the method for measuring a reference signal, and a same technical effect can be achieved. To avoid repetition, details are not described herein again.

Figure 8:
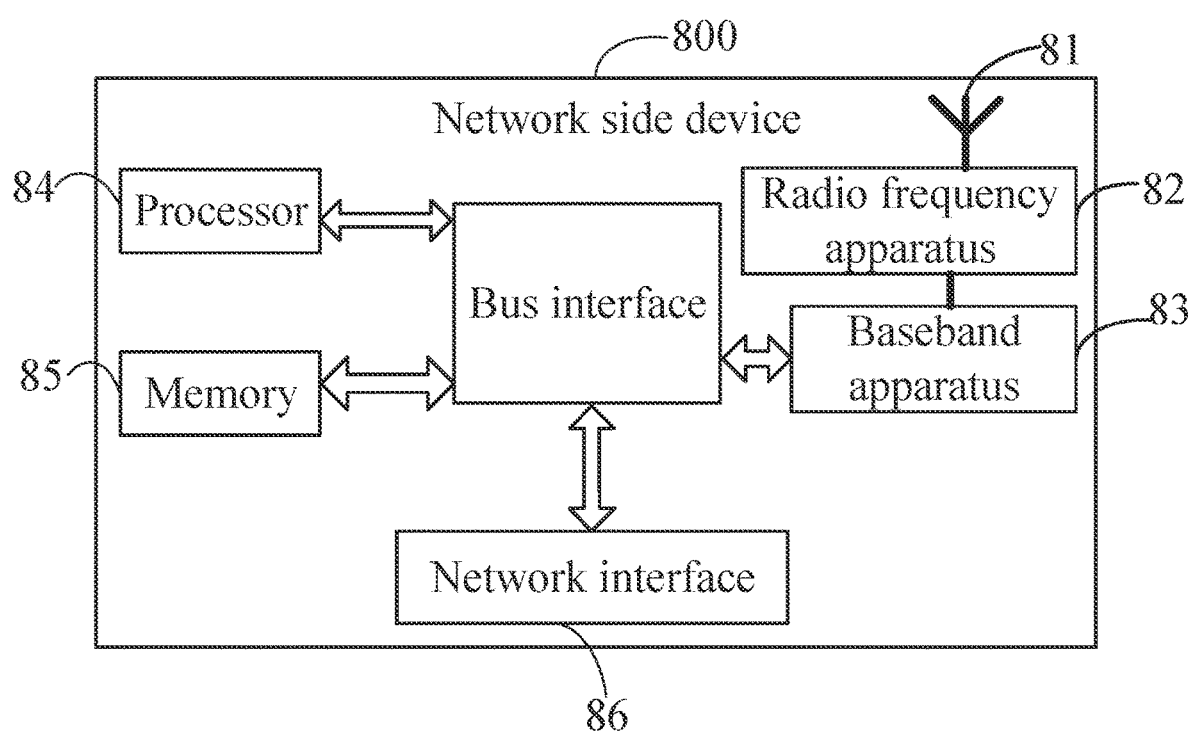
FIG. 8 is a schematic structural diagram of a network side device according to an embodiment of this application.

In some implementations, an embodiment of this application further provides a network side device. As shown in FIG. 8, the network device 800 includes an antenna 81, a radio frequency apparatus 82, and a baseband apparatus 83. The antenna 81 is connected to the radio frequency apparatus 82. In an uplink direction, the radio frequency apparatus 82 receives information by using the antenna 81, and transmits the received information to the baseband apparatus 83 for processing. In a downlink direction, the baseband apparatus 83 processes information to be sent and sends the information to the radio frequency apparatus 82, and the radio frequency apparatus 82 processes the received information and sends the information through the antenna 81.

The frequency band processing apparatus may be located in the baseband apparatus 83. The method performed by the network side device in the foregoing embodiment may be implemented in the baseband apparatus 83. The baseband apparatus 83 includes a processor 84 and a memory 85.

The baseband apparatus 83 may include, for example, at least one baseband board, where a plurality of chips are disposed on the baseband board. As shown in FIG. 8, one chip is, for example, the processor 84, which is connected to the memory 85, so as to invoke a program in the memory 85 to perform operations of the network device shown in the foregoing method embodiment.

The baseband apparatus 83 may further include a network interface 86, configured to exchange information with the radio frequency apparatus 82, where the interface is, for example, a Common Public Radio Interface (CPRI).

In some implementations, the network side device in this embodiment of the present invention further includes an instruction or a program stored in the memory 85 and executable by the processor 84. The processor 84 invokes the instruction or the program in the memory 85 to perform the method performed by the modules shown in FIG. 5, and a same technical effect can be achieved. To avoid repetition, details are not described herein again.

An embodiment of this application further provides a readable storage medium, where the readable storage medium stores a program or an instruction, and when the program or the instruction is executed by a processor, the processes in the embodiment of the method for measuring a reference signal are implemented, and a same technical effect can be achieved. To avoid repetition, details are not described herein again.

The processor may be a processor in the terminal in the foregoing embodiment. The readable storage medium includes a computer-readable storage medium such as a ROM, a Random Access Memory (RAM), a magnetic disk, an optical disc, or the like.

An embodiment of this application also provides a chip, where the chip includes a processor and a communications interface, and the communications interface is coupled to the processor. The processor is configured to run a program or an instruction to implement the processes in the embodiment of the method for measuring a reference signal, and a same technical effect can be achieved. To avoid repetition, details are not described herein again.

It should be understood that the chip mentioned in this embodiment of this application may also be referred to as a system-level chip, a system chip, a chip system, or an on-chip system chip.

An embodiment of this application also provides a computer program product. The computer program product is stored in a nonvolatile memory, and the computer program product is executed by at least one processor to implement the processes in the embodiment of the method for measuring a reference signal, and a same technical effect can be achieved. To avoid repetition, details are not described herein again.

An embodiment of this application also provides a communications device, configured to implement the processes in the embodiment of the method for measuring a reference signal, and a same technical effect can be achieved. To avoid repetition, details are not described herein again.

It should be noted that, in this specification, the terms "include," "comprise," or their any other variant is intended to cover a non-exclusive inclusion, so that a process, a method, an article, or an apparatus that includes a list of elements not only includes those elements, but also includes other elements which are not expressly listed, or further includes elements inherent to such process, method, article, or apparatus. An element limited by "includes a . . . " does not, without more constraints, preclude the presence of additional identical elements in the process, method, article, or apparatus that includes the element. In addition, it should be noted that the scope of the method and the apparatus in the embodiments of this application is not limited to performing functions in an illustrated or discussed sequence, and may further include performing functions in a basically simultaneous manner or in a reverse sequence according to the functions concerned. For example, the described method may be performed in an order different from that described, and the steps may be added, omitted, or combined. In addition, features described with reference to some examples may be combined in other examples.

Based on the descriptions of the foregoing implementation manners, a person skilled in the art may clearly understand that the method in the foregoing embodiment may be implemented by software in addition to a necessary universal hardware platform or by hardware only. In most circumstances, the former is a preferred implementation manner. Based on such understanding, the technical solutions of this application essentially, or the part contributing to the prior art may be implemented in a form of a software product. The computer software product is stored in a storage medium (for example, a ROM/RAM, a magnetic disk, or a compact disc), and includes several instructions for instructing a terminal (which may be a mobile phone, a computer, a server, an air conditioner, a network device, or the like) to perform the method described in the embodiments of this application.

The embodiments of this application are described above with reference to the accompanying drawings, but this application is not limited to the foregoing specific implementation manners. The foregoing specific implementation manners are merely schematic instead of restrictive. Under enlightenment of this application, a person of ordinary skills in the art may make many forms without departing from aims and the protection scope of claims of this application, all of which fall within the protection scope of this application.

The invention claimed is:

1. A method for measuring a reference signal, comprising:
   performing, by a terminal, Layer 1 (L1) measurement on a reference signal of a neighboring cell based on a measurement restriction condition to obtain a measurement result; and
   sending, by the terminal, the measurement result,
   wherein the measurement restriction condition comprises:
      when a Synchronization Signal (SS) and Physical Broadcast CHannel (PBCH) Block (SSB) of a first cell conflicts with an SSB or a Channel State Information-Reference Signal (CSI-RS) of a second cell, performing, by the terminal, measurement on one of the SSB of the first cell, the SSB of the second cell, or the CSI-RS of the second cell, wherein the SSB of the first cell is configured for L1 beam measurement,
   wherein the first cell and the second cell meet at least one of the following:
      the first cell is the neighboring cell, and the second cell is a current cell; or
      the first cell is the neighboring cell, and the second cell is the neighboring cell, and
   wherein the method further comprises:
      when a signal of the first cell and a signal of the second cell are in a same time domain unit, determining, by the terminal, that the signal of the first cell conflicts with the signal of the second cell.

2. The method according to claim 1, wherein before the performing, by a terminal, L1 measurement on a reference signal of a neighboring cell based on a measurement restriction condition, the method further comprises:
   receiving, by the terminal, indication information, wherein the indication information is configured for indicating a periodicity and a position of the reference signal.

3. The method according to claim 1, wherein the performing, by a terminal, L1 measurement on a reference signal of a neighboring cell based on a measurement restriction condition comprises:

performing, by the terminal, L1 measurement on the reference signal of the neighboring cell within a measurement time configuration of the reference signal; or performing, by the terminal, L1 measurement on the reference signal of the neighboring cell within and outside a measurement time configuration of the reference signal.

4. The method according to claim 1, wherein when the SSB of the first cell conflicts with the SSB or the CSI-RS of the second cell, performing, by the terminal, measurement on one of the SSB of the first cell, the SSB of the second cell, or the CSI-RS of the second cell comprises:

on a Frequency Range 1 (FR 1) frequency band, performing, by the terminal, measurement on the SSB of the first cell without a restriction condition;

on the Frequency Range 1 (FR 1) frequency band, performing, by the terminal, measurement on one of:
the SSB of the first cell, or
the SSB or the CSI-RS of the second cell; or on a Frequency Range 2 (FR 2) frequency band, performing, by the terminal, measurement on one of:
the SSB of the first cell, or
the SSB or the CSI-RS of the second cell.

5. The method according to claim 4, wherein on an FR 1 frequency band, the performing, by the terminal, measurement on the SSB of the first cell without a restriction condition is performed when at least one of the following is met:

the SSB of the first cell, and at least one of the SSB or the CSI-RS of the second cell have a same SubCarrier Spacing (SCS);

the first cell and the second cell belong to different cells, and timing information of the first cell and timing information of the second cell meet a preset timing condition; or the SSB of the first cell, and at least one of the SSB or the CSI-RS of the second cell have different SCSs, and the terminal supports receiving data and an SSB simultaneously under different parameter sets.

6. The method according to claim 4, wherein on the FR 1 frequency band, the performing, by the terminal, measurement on one of the SSB of the first cell or the SSB or the CSI-RS of the second cell is performed when at least one of the following is met:

the SSB of the first cell, and at least one of the SSB or the CSI-RS of the second cell have a same SubCarrier Spacing (SCS), the first cell and the second cell belong to different cells, and timing information of the first cell and timing information of the second cell do not meet a preset timing condition;

the SSB of the first cell, and at least one of the SSB or the CSI-RS of the second cell have different SCSs, the terminal supports receiving data and an SSB simultaneously under different parameter sets, the first cell and the second cell belong to different cells, and timing information of the first cell and timing information of the second cell do not meet a preset timing condition;

the SSB of the first cell, and at least one of the SSB or the CSI-RS of the second cell have different SCSs, and the terminal does not support receiving data and an SSB simultaneously under different parameter sets; or the first cell and the second cell belong to different cells.

7. The method according to claim 1, wherein the measurement restriction condition comprises: on a Frequency Range 1 (FR 1) frequency band, a CSI-RS of the first cell conflicts with the SSB of the second cell, and the SSB of the second cell is within an activated BandWidth Part (BWP):

when the SSB of the second cell and the CSI-RS of the first cell have a same SubCarrier Spacing (SCS), performing, by the terminal, measurement on the CSI-RS of the first cell without a restriction condition; or when the SSB of the second cell and the CSI-RS of the first cell have different SCSs,
performing, by the terminal, measurement on the CSI-RS of the first cell without a restriction condition; or
performing, by the terminal, measurement on at least one of the CSI-RS of the first cell or the SSB of the second cell, wherein the CSI-RS of the first cell is configured for L1 beam measurement, and at least one of the first cell or the second cell is the neighboring cell.

8. The method according to claim 7, wherein when the SSB of the second cell and the CSI-RS of the first cell have a same SCS, the performing, by the terminal, measurement on the CSI-RS of the first cell without a restriction condition is performed when the following is met:

the first cell and the second cell belong to different cells, and timing information of the first cell and timing information of the second cell meet a preset timing condition.

9. The method according to claim 7, wherein when the SSB of the second cell and the CSI-RS of the first cell have different SCSs, the performing, by the terminal, measurement on the CSI-RS of the first cell without a restriction condition is performed when at least one of the following is met:

the terminal supports receiving data and an SSB simultaneously under different parameter sets; or the first cell and the second cell belong to different cells, and timing information of the first cell and timing information of the second cell meet a preset timing condition.

10. The method according to claim 7, wherein when the SSB of the second cell and the CSI-RS of the first cell have different SCSs, the performing, by the terminal, measurement on at least one of the CSI-RS of the first cell or the SSB of the second cell is performed when at least one of the following is met:

the terminal does not support receiving data and an SSB simultaneously under different parameter sets;

the first cell and the second cell belong to different cells, and timing information of the first cell and timing information of the second cell do not meet a preset timing condition; or the first cell and the second cell belong to different cells.

11. The method according to claim 1, wherein the measurement restriction condition comprises:

on a Frequency Range 1 (FR 1) frequency band, when a CSI-RS of the first cell conflicts with the CSI-RS of the second cell, performing, by the terminal, measurement on the CSI-RS of the first cell without a restriction condition, wherein the CSI-RS of the first cell is configured for L1 beam measurement, and at least one of the first cell or the second cell is the neighboring cell.

12. The method according to claim 11, wherein the first cell and the second cell belong to different cells, and timing information of the first cell and timing information of the second cell meet a preset timing condition.

13. The method according to claim 1, wherein the measurement restriction condition comprises:

on a Frequency Range 2 (FR 2) frequency band, when a CSI-RS of the first cell conflicts with the SSB of the second cell, performing, by the terminal, measurement on one of the CSI-RS of the first cell and the SSB of the second cell, wherein the CSI-RS of the first cell is configured for L1 beam measurement, and at least one of the first cell or the second cell is the neighboring cell or the neighboring TRP.

14. The method according to claim 1, wherein the measurement restriction condition comprises:
on a Frequency Range 2 (FR 2) frequency band, when a CSI-RS of the first cell conflicts with the CSI-RS of the second cell, performing, by the terminal, measurement on one of the CSI-RS of the first cell and a the SSB of the second cell when at least one of the following is met:
the first cell and the second cell are different cells, and timing information of the first cell and timing information of the second cell do not meet a timing condition; or
the first cell and the second cell are different cells,
wherein the CSI-RS of the first cell is configured for L1 beam measurement, and at least one of the first cell or the second cell is the neighboring cell.

15. The method according to claim 1, wherein the reference signal of the neighboring cell meets at least one of the following:
configuration information of a reference signal of the terminal is configured with cell identifier information of the neighboring cell;
a Transmission Configuration Indicator (TCI), spatial relation information, or Quasi-Co-Location (QCL) information of the terminal is associated with the reference signal of the neighboring cell;
Downlink Control Information (DCI), a Control REsource SET (CORESET), or a TCI of a control channel, spatial relation information, or QCL information for scheduling the reference signal is associated with the reference signal of the neighboring cell; or
DCI, a CORESET, or a control channel for scheduling the reference signal belongs to the neighboring cell.

16. A method for measuring a reference signal, wherein the method comprises:
receiving, by a network side device, a measurement result, wherein the measurement result is obtained by a terminal performing Layer 1 (L1) measurement on a reference signal of a neighboring cell based on a measurement restriction condition,
wherein the measurement restriction condition comprises:
when a Synchronization Signal (SS) and Physical Broadcast CHannel (PBCH) Block (SSB) of a first cell conflicts with an SSB or a Channel State Information-Reference Signal (CSI-RS) of a second cell, the terminal performs measurement on one of the SSB of the first cell, the SSB of the second cell, or the CSI-RS of the second cell, wherein the SSB of the first cell is configured for L1 beam measurement,
wherein the first cell and the second cell meet at least one of the following:
the first cell is the neighboring cell, and the second cell is a current cell; or the first cell is the neighboring cell, and the second cell is the neighboring cell, and
wherein when a signal of the first cell and a signal of the second cell are in a same time domain unit, the terminal determines that the signal of the first cell conflicts with the signal of the second cell.

17. A network side device, comprising a processor, a memory, and a program or an instruction stored in the memory and executable on the processor, wherein when the program or the instruction is executed by the processor, the method for measuring a reference signal according to claim 16 is implemented.

18. A terminal, comprising:
a memory storing computer-readable instructions; and
a processor coupled to the memory and configured to execute the computer-readable instructions, wherein the computer-readable instructions, when executed by the processor, cause the processor to perform operations comprising:
performing Layer 1 (L1) measurement on a reference signal of a neighboring cell based on a measurement restriction condition to obtain a measurement result; and
sending the measurement result,
wherein the measurement restriction condition comprises:
when a Synchronization Signal (SS) and Physical Broadcast CHannel (PBCH) Block (SSB) of a first cell conflicts with an SSB or a Channel State Information-Reference Signal (CSI-RS) of a second cell, performing, by the terminal, measurement on one of the SSB of the first cell, the SSB of the second cell, or the CSI-RS of the second cell, wherein the SSB of the first cell is configured for L1 beam measurement,
wherein the first cell and the second cell meet at least one of the following:
the first cell is the neighboring cell, and the second cell is a current cell; or
the first cell is the neighboring cell, and the second cell is the neighboring cell, and
wherein the operations further comprise:
when a signal of the first cell and a signal of the second cell are in a same time domain unit, determining, by the terminal, that the signal of the first cell conflicts with the signal of the second cell.

19. The terminal according to claim 18, wherein before the performing L1measurement on a reference signal of a neighboring cell based on a measurement restriction condition, the operations further comprise:
receiving indication information, wherein the indication information is configured for indicating a periodicity and a position of the reference signal.

20. The terminal according to claim 18, wherein the performing L1 measurement on a reference signal of a neighboring cell based on a measurement restriction condition comprises:
performing L1 measurement on the reference signal of the neighboring cell within a measurement time configuration of the reference signal; or performing L1 measurement on the reference signal of the neighboring cell within and outside a measurement time configuration of the reference signal.

* * * * *